(12) United States Patent
Feger

(10) Patent No.: US 10,103,474 B2
(45) Date of Patent: Oct. 16, 2018

(54) COMPACT CONNECTOR AND COMPACT SOCKET FOR ELECTRICALLY POWERING A PORTABLE DEVICE FROM A FIXED NETWORK

(71) Applicant: NEW GENERATION NATURAL GAS NATURAL GROWTH, Vernon (FR)

(72) Inventor: Damien Feger, Vernon (FR)

(73) Assignee: NEW GENERATION NATRUAL GAS NATURAL GROWTH, Vernon (FR)

( * ) Notice: Subject to any disclaimer, the term of this patent is extended or adjusted under 35 U.S.C. 154(b) by 0 days.

(21) Appl. No.: 15/574,804

(22) PCT Filed: May 19, 2016

(86) PCT No.: PCT/FR2016/051183
§ 371 (c)(1),
(2) Date: Nov. 16, 2017

(87) PCT Pub. No.: WO2016/185144
PCT Pub. Date: Nov. 24, 2016

(65) Prior Publication Data
US 2018/0151974 A1 May 31, 2018

(30) Foreign Application Priority Data
May 19, 2015 (FR) ..................... 15 01047

(51) Int. Cl.
*B01D 50/00* (2006.01)
*H01R 13/453* (2006.01)
(Continued)

(52) U.S. Cl.
CPC ............ *H01R 13/4532* (2013.01); *B63J 3/04* (2013.01); *H01R 13/5213* (2013.01);
(Continued)

(58) Field of Classification Search
CPC ........ F02M 35/04; B01D 46/26; B01D 50/00; B01D 46/10; B01D 46/2411
(Continued)

(56) References Cited

U.S. PATENT DOCUMENTS

| 3,635,184 A | 1/1972 | Liautaud |
| 9,891,002 B2 * | 2/2018 | Shedd ................... F28D 1/0233 |

(Continued)

FOREIGN PATENT DOCUMENTS

| FR | 2 647 604 | 11/1990 |
| FR | 2 946 471 A | 12/2010 |

*Primary Examiner* — Phuong T Nguyen
(74) *Attorney, Agent, or Firm* — Muncy, Geissler, Olds & Lowe, P.C.

(57) ABSTRACT

An electrical connection assembly between a movable object and a fixed installation, the assembly including the following elements of substantially cylindrical shape, centered around a vertical axis and going downwards: a windlass using a chain to move a rod along the axis; an outlet receiving a plurality of connections and provided with a hawse pipe in which the rod can engage with small clearance; a connector provided with a top endplate receiving, facing the connections of the outlet, the complementary connections; a turnable lid protecting the connections; a guide and locking system for guiding and locking the rod; and having its bottom portion of conical shape; a rod passing downwards in succession through the hawse pipe of the outlet, then the lid, in order to reach a locking system for locking with the connector; and a basket of funnel-shape, with its large opening upwards, its shape being complementary to the bottom portion of the connector, and centering the connector on the axis.

8 Claims, 9 Drawing Sheets

(51) Int. Cl.
*H01R 13/52* (2006.01)
*H01R 13/631* (2006.01)
*H01R 13/73* (2006.01)
*B63J 3/04* (2006.01)

(52) U.S. Cl.
CPC .......... *H01R 13/631* (2013.01); *H01R 13/73* (2013.01); *B63J 2003/043* (2013.01); *H01R 2201/26* (2013.01)

(58) Field of Classification Search
USPC .......... 55/507, 317, 322, 509, 498; 439/142
See application file for complete search history.

(56) References Cited

U.S. PATENT DOCUMENTS

| | | | |
|---|---|---|---|
| 2002/0189216 A1* | 12/2002 | Wright | B01D 46/0004 55/513 |
| 2002/0195143 A1* | 12/2002 | Paplow | B65H 75/40 137/355.2 |
| 2004/0020655 A1* | 2/2004 | Rusby | E21B 21/16 166/369 |
| 2004/0127084 A1 | 7/2004 | Glennie et al. | |
| 2006/0079107 A1 | 4/2006 | Allensworth et al. | |
| 2006/0242949 A1* | 11/2006 | Ueda | F01N 3/0842 60/286 |

* cited by examiner

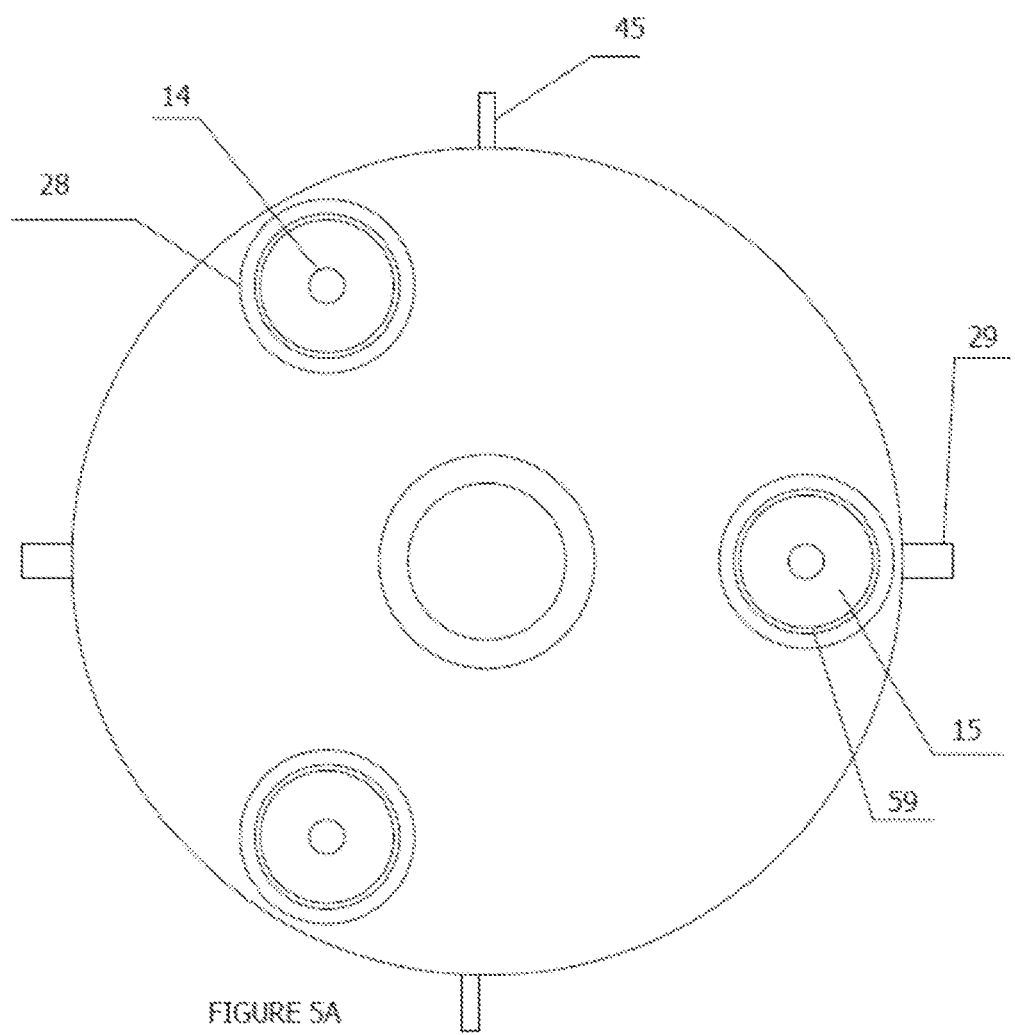

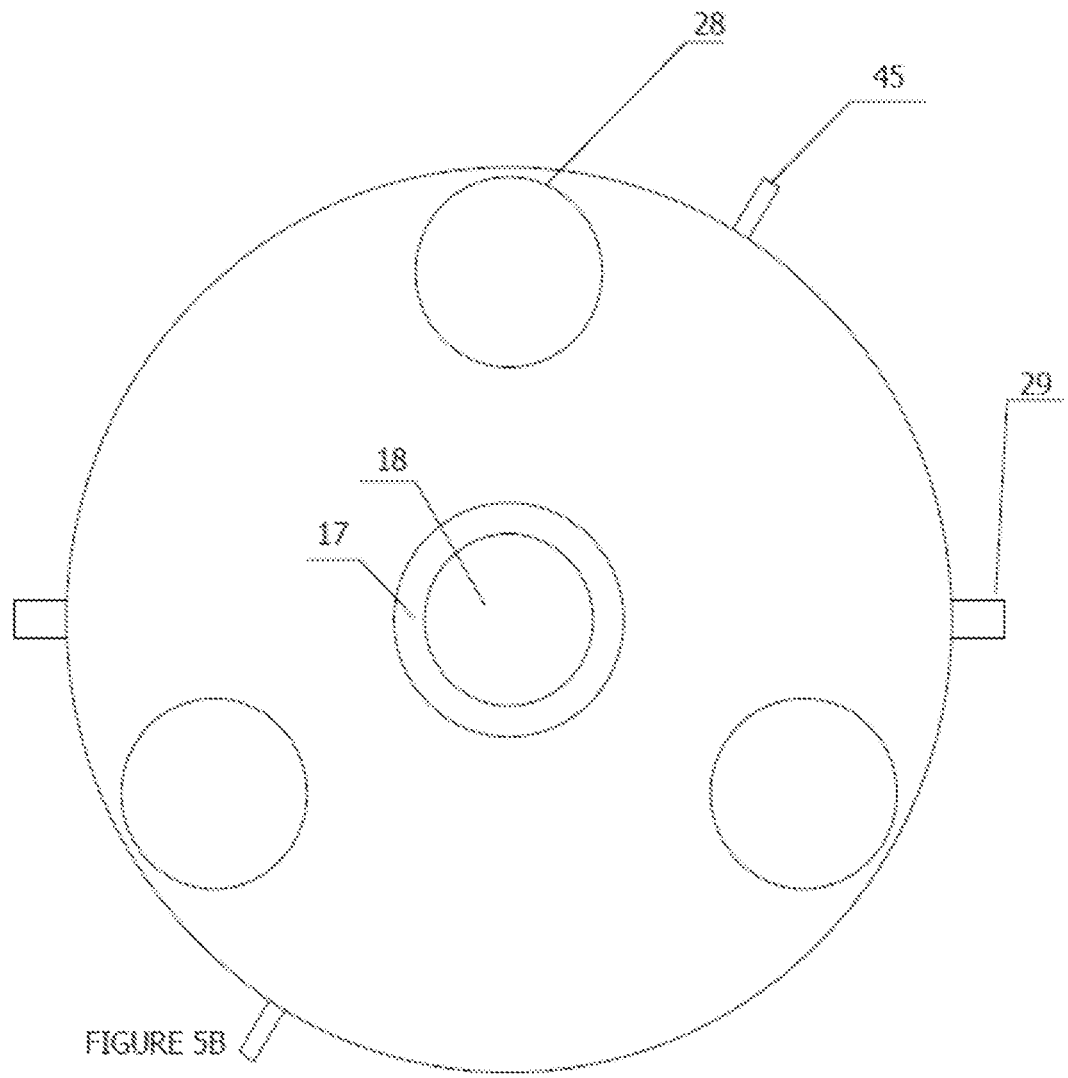

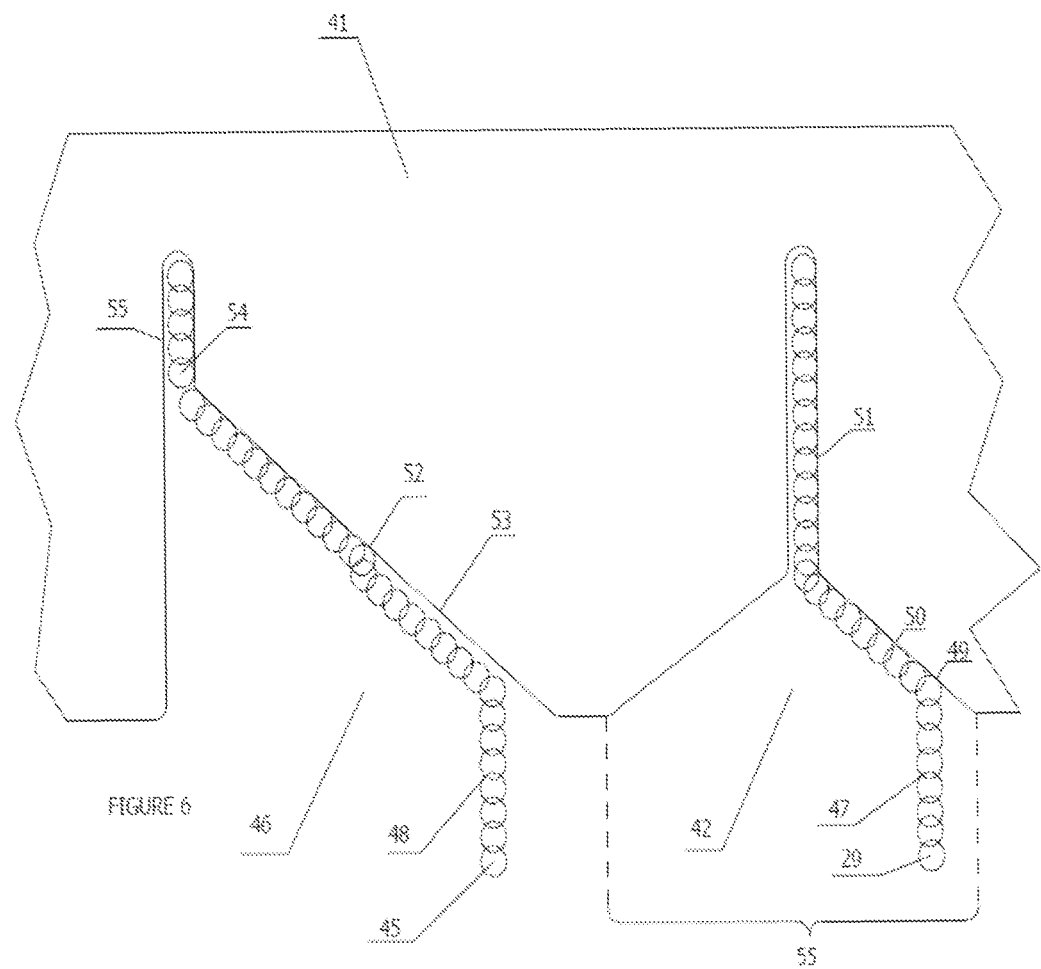

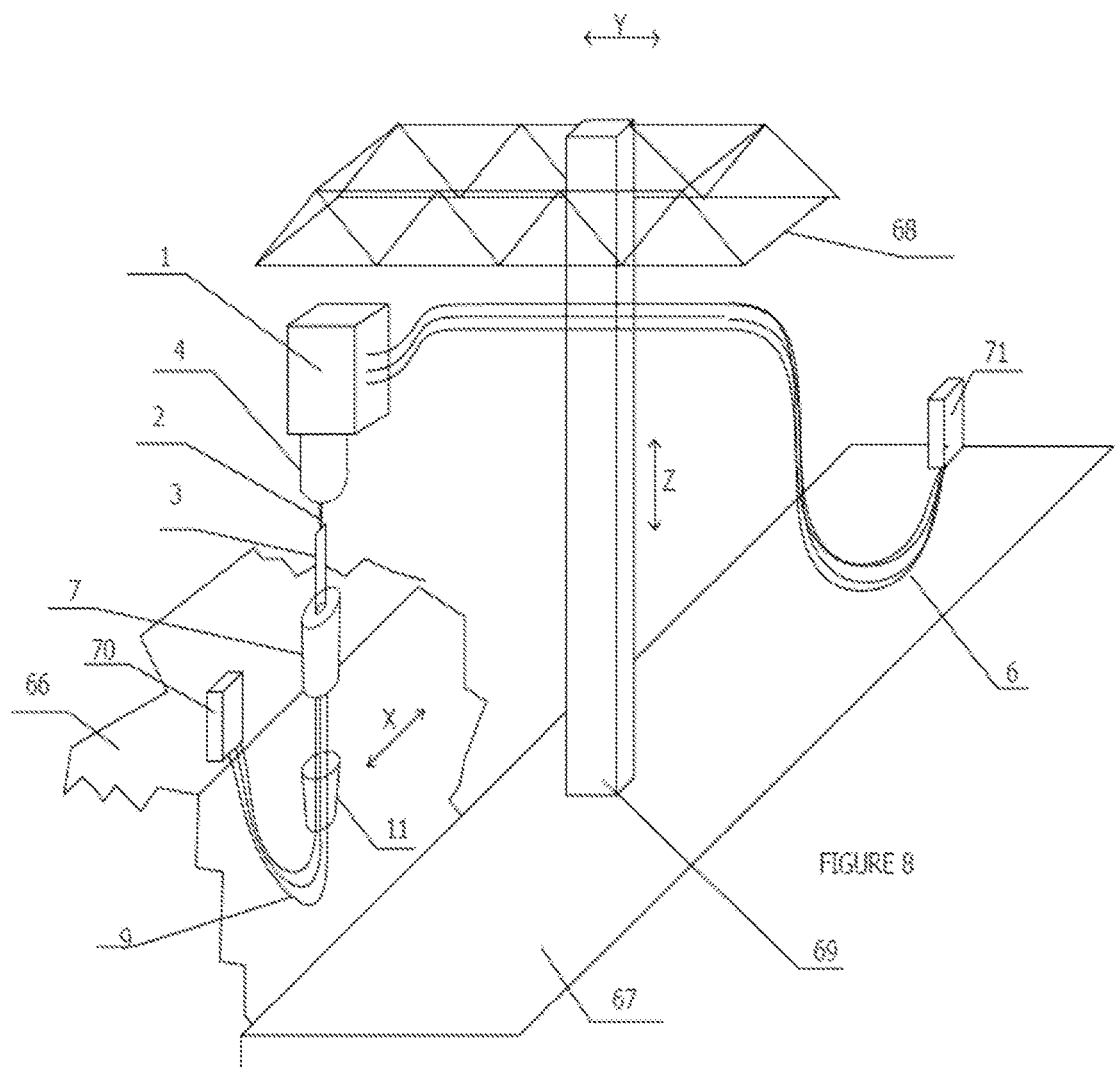

COMPACT CONNECTOR AND COMPACT SOCKET FOR ELECTRICALLY POWERING A PORTABLE DEVICE FROM A FIXED NETWORK

BACKGROUND OF THE INVENTION

Field of the Invention

The present invention relates to the field of electrically powering movable objects when they are stationary, and in particular a ship alongside a quay. Specifically, for ecological or economic reasons, it is more and more appropriate to make it possible to exchange electricity between ships in port and land, either to avoid pollution from their onboard power generators, or else to recharge their electricity storage capabilities, for a ship that is electrically propelled or hybrid.

Brief Discussion of the Related Art

A first approach is to use manual connectors that the crew or port personnel handle in order to set up the connection, possibly assisted by systems such as cranes or hoists in order to carry the load of said connectors and their cables. That approach is clearly expensive in terms of manpower, gives rise to a loss of time and can be dangerous when large powers are involved needing connectors and cables that are heavy and bulky. In order to solve that difficulty, a first solution, as described in patent application Ser. No. 89/06863 filed on May 25, 1989, relates to using a system for supporting the connector and the cables by means of a traveling gantry extending over the ship and thus making handling easier. A second solution, as described in patent application Ser. No. 09/02725, filed on Jun. 5, 2009, relates to using a system on board the ship for lifting and guiding the connector over the quay, the system being completely mechanized. That approach eliminates direct handling of connectors and cables by the crew, but it requires guidance mechanisms and contact protection at the connector and the outlet that are complex and thus simultaneously expensive, bulky, and not very reliable.

To understand the state of the art in this field, reference may usefully be made to the article "Courant de quai: la fête d'Amp ère" [Quay-side electricity: Ampere's quay] published in the journal "Navires et marine marchande" [Ships and merchant shipping] in July 2013. The object of the present application is thus to present a novel solution for reducing the size and the complexity of systems for making a connection between a movable object and the fixed network.

SUMMARY OF THE INVENTION

The present invention provides an assembly for making an electrical connection between a movable object and a fixed installation, or between two movable objects, the assembly being characterized in that it is made up of comprising the following elements of substantially cylindrical shape, going downwards and centered around a vertical axis (12):
- a windlass (1) using a chain or a cable (2) to move a shuttle rod (3) along this main vertical axis (12);
- an outlet (4) receiving a plurality of electrical contacts (38) and provided in its bottom portion with a peripheral skirt (41) having funnel-shaped openings (42 and 46), larger openings facing downwards, and a hawse pipe (37) in which the shuttle rod (3) can engage with small clearance; and
- a connector (7) provided with:
  a top endplate (13) receiving, facing the contacts (38) of the outlet (4), complementary contacts (14);
  one or more lugs (29) controlling progressive turning of the connector (7) relative to the outlet (4) and about the main vertical axis (12) while they are being progressively engaged in the opening(s) (42) of shapes that are defined so that when the top of the connector engages in the outlet (4), the contacts (14 and 38) are brought progressively into mutual alignment so as to make it possible for them to engage in one another when the connector comes into abutment against the outlet;
  a lid (27):
    of a diameter perceptibly smaller than the diameter of the skirt (41);
    placed above the top endplate (13);
    turnable about the main vertical axis (12) and protecting the contacts (14);
    provided with a plurality of openings (28) that, when in alignment with the contacts (14), enable the contacts to be engaged with the contacts (38);
    one or more lugs (29) controlling progressive turning of the lid about the main vertical axis (12) when they are engaged in the opening(s) (46) of shape that is defined so that when the contacts (14 and 38) are in alignment as a result of the connector (7) turning under the control of the lugs (29) engaging in the openings (42), the lid turns progressively so as to bring the openings (28) to face the contacts (14) and enable them to engage the contacts (38); and
    provided with an opening centered on the main vertical axis (12), of funnel-shape (31) and facilitating insertion of the shuttle rod with progressively reducing clearance on being lowered towards the connector (7) into a central cavity (18) of a hub (17) that is secured to the top endplate (13), until, at the end of its stroke, the rod encounters a locking system (10) secured to said hub (17):
  a hub (17):
    transferring forces from the shuttle rod against the locking system (10) to the top endplate (13) and the connector assembly (7); and
    acting as a rotary bearing about the main vertical axis (12) for the lid (27);
  a cover (26) of conical shape, and together with the lid (27) surrounding the entire connector (7);
  a shuttle rod (3) passing downwards with small clearance successively through the hawse pipe (37) of the outlet (4), then the lid (27), and once more with small clearance through the hub (17) of the connector (7), characterized by the presence at its bottom end of a substantially conical shape (30) and of a recess (32) presenting a bearing face (19) for the locking system (10) for locking with the connector (7); and
  a basket (11) of funnel-shape with its large opening towards the top, complementary to the shape of the cover (26) of the connector, and centering it along the main vertical axis (12).

BRIEF DESCRIPTION OF THE DRAWINGS

FIGS. 5a and 5b show plan views of the connector when the lid is respectively open or closed.

FIG. 6 shows a developed half-view of the skirt.

FIG. 8 shows an implementation of the invention for powering a ship when docked at a quay.

DETAILED DESCRIPTION OF THE PREFERRED EMBODIMENTS

Figure 1:
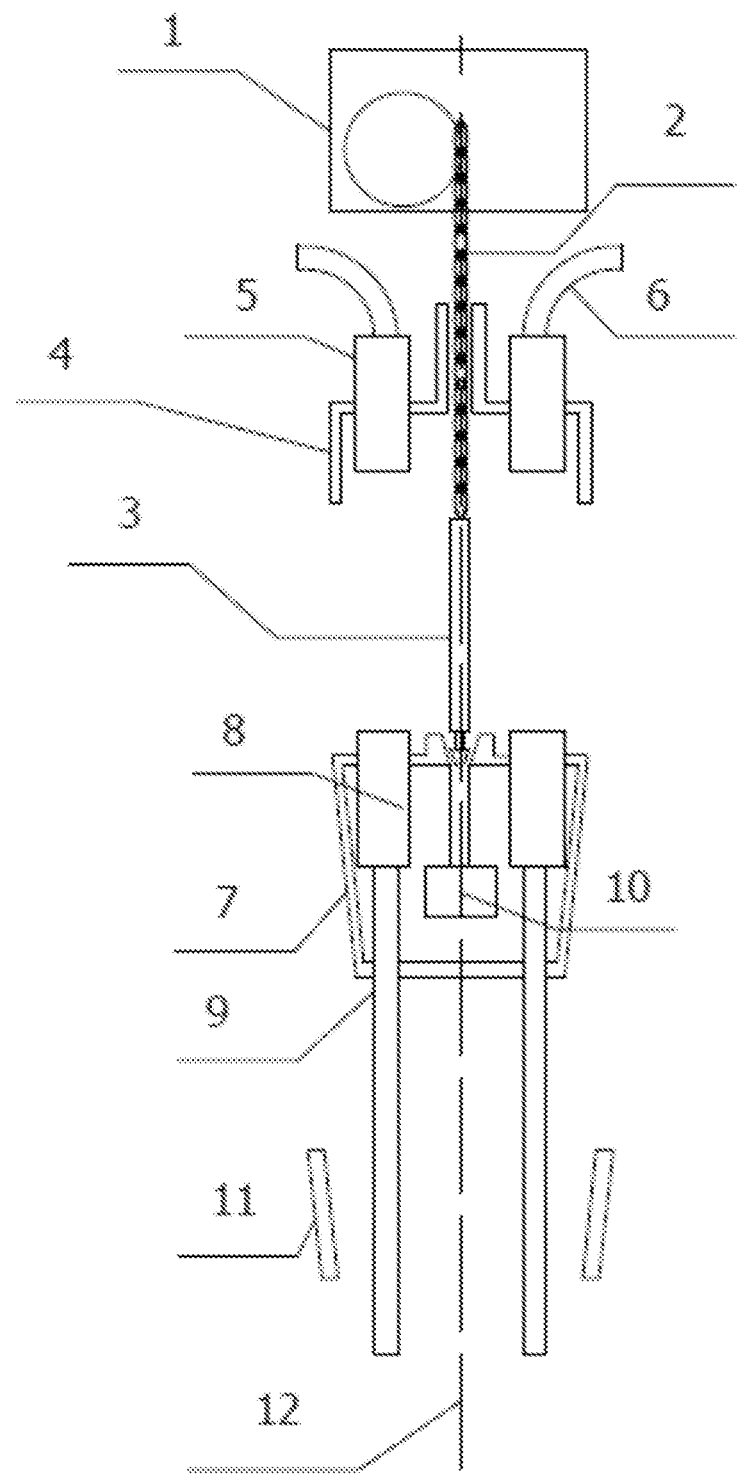
FIG. 1 shows an assembly for making an electrical connection between a movable object and a fixed installation.

FIG. 1 shows the main components of the solution proposed:
- on one side, a windlass (1) provided with a chain (2), or alternatively a cable, having a shuttle rod (3) at its end passing through an outlet (4) having the contacts (5) needed for exchanging electricity and connected to power cables (6); and
- on the other side, a connector (7) provided with:
- a set of contacts (8) and of power cables (9) corresponding to those of the outlet (4);
- a guide and locking system (10) for guiding and locking the shuttle rod (3); and
- a basket (11) for receiving the connector (7) when it is not in use.

It can be seen that with this arrangement, providing guide means are put into place to align the respective contacts of the outlet and of the connector facing one another, it suffices, once the shuttle rod is locked to the connector, to hoist it towards the outlet in order to make the connection.

Figure 2:
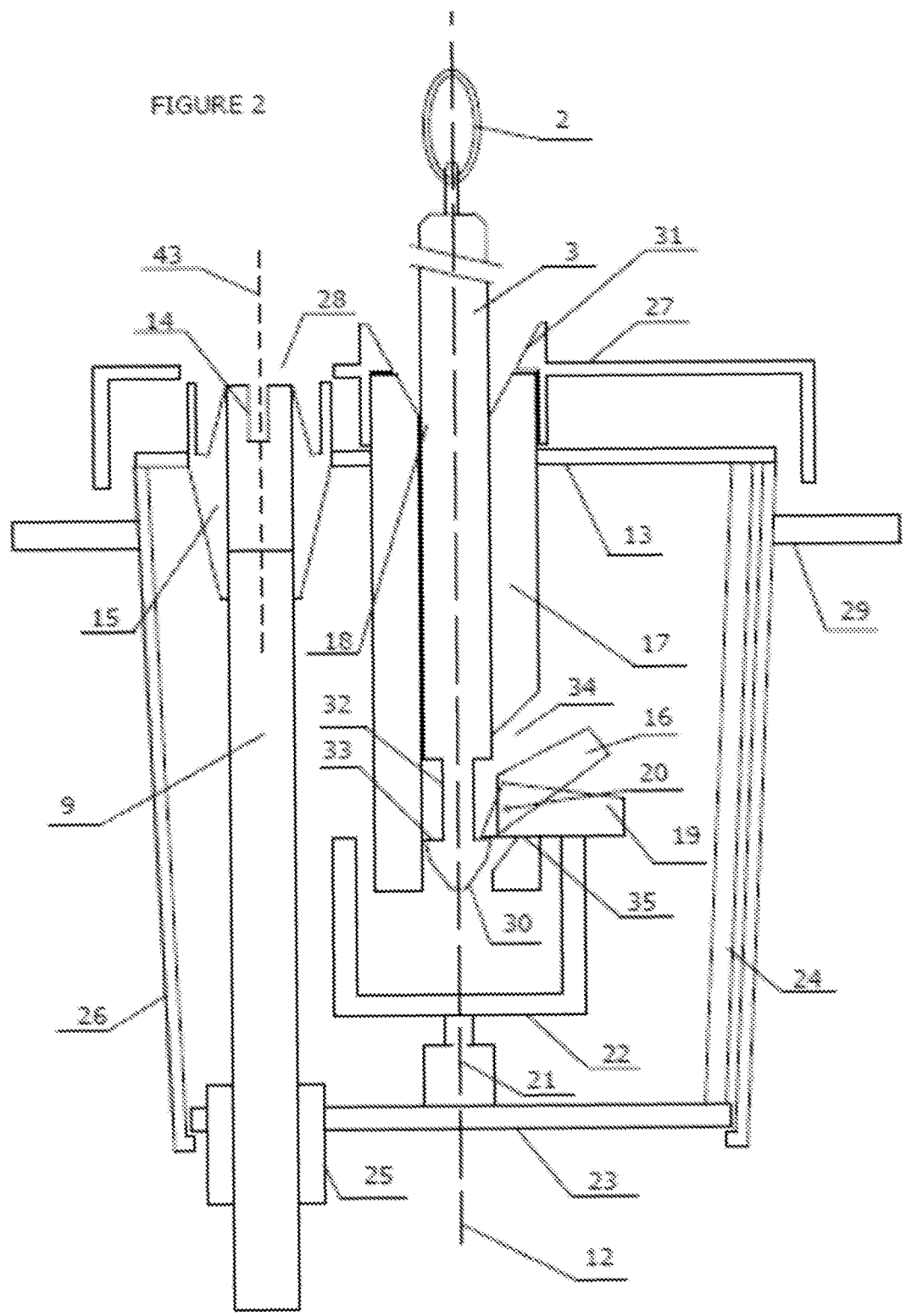
FIG. 2 shows a section view showing the main internal characteristics of a connector designed in accordance with the proposed invention.

FIG. 2 is in the form of a section view showing the main internal characteristics of a connector designed in accordance with the proposed invention, for exchanging power by means of three-phase electricity requiring three power contacts (it should be observed that this number is selected merely by way of example, and that depending on requirements, the proposed invention could be applied to some other number of contacts).

The connector is generally cylindrical in shape about the axis (12) and it is mainly constituted by:
- a top circular endplate (13) receiving three contacts (14) (which are shown herein by way of example as female contacts) surrounded by insulation (15) and connected to three cables (16) corresponding to the three phases that are used in this example for exchanging power between the ship and the quay;
- a central hub (17) mechanically connected to the top endplate (13), and pierced by a circular cavity (18) into which the shuttle rod (3) can be inserted with small clearance, which shuttle rod is likewise cylindrical in shape about the axis (12);
- a system of jaws (19) pivoting about pins (20), which pins are mechanically secured to the hub (17), and the jaws turning under the control of an actuator (21) via a pusher (22);
- a bottom endplate (23) mechanically connected to the top endplate (13) via a plurality of spacers (24) supporting the actuator (21) and the cables (16) via cable glands (25);
- a cover (26) of substantially conical shape protecting all of these mechanisms;
- a lid (27) having three openings (28) corresponding to the contacts (14) and rotatable about the axis (12) above the top endplate (13); and
- lugs (29) enabling a rotary torque to be imparted to the connector assembly about the axis (12).

With all these provisions, the shuttle rod (3) can be guided and locked in the connector as follows: using the windlass (1), the rod (3) suspended from the chain (2) is lowered along the axis (12) towards the cavity (18) in the hub (17); and entry of the shuttle rod (3) into the cavity is facilitated by the fact that the bottom portion of the shuttle rod presents a substantially conical shape (30), while the hub (17) and the lid (27) present a funnel shape (31).

When the shuttle rod (3) is engaged in the cavity (18) it can move down until its bottom portion is level with the jaws (19). In order to enable the shuttle rod to be locked by the jaws (19), the bottom portion of the shuttle rod has a recess (32) presenting a bearing face (33) for engaging the jaws. Likewise, the bottom faces of the cavities (34) that receive the jaws (19) in the hub (17) present bearing faces (35) for engaging the jaws and located on the other side of the pins (20). It can thus be understood that once the shuttle rod (3) has been engaged in the jaws (19), and when it is lifted, it causes the jaws (19) to bear simultaneously on the bearing faces (33 and 35) and acts via the pins (20) to lift the connector assembly, with the jaws (19) being blocked against the bearing faces (33 and 35), while also ensuring that the shuttle rod (3) and the connector (7) are in alignment along the axis (12).

In order to unlock the shuttle rod (3) from the connector (7), it can be understood that it suffices to use the actuator (21) to act via the pushers (22) to lift the jaws (19) into a position shown in dashed lines in the figure, serving to release the shuttle rod and allow it to be lifted out of the connector.

Figure 3:
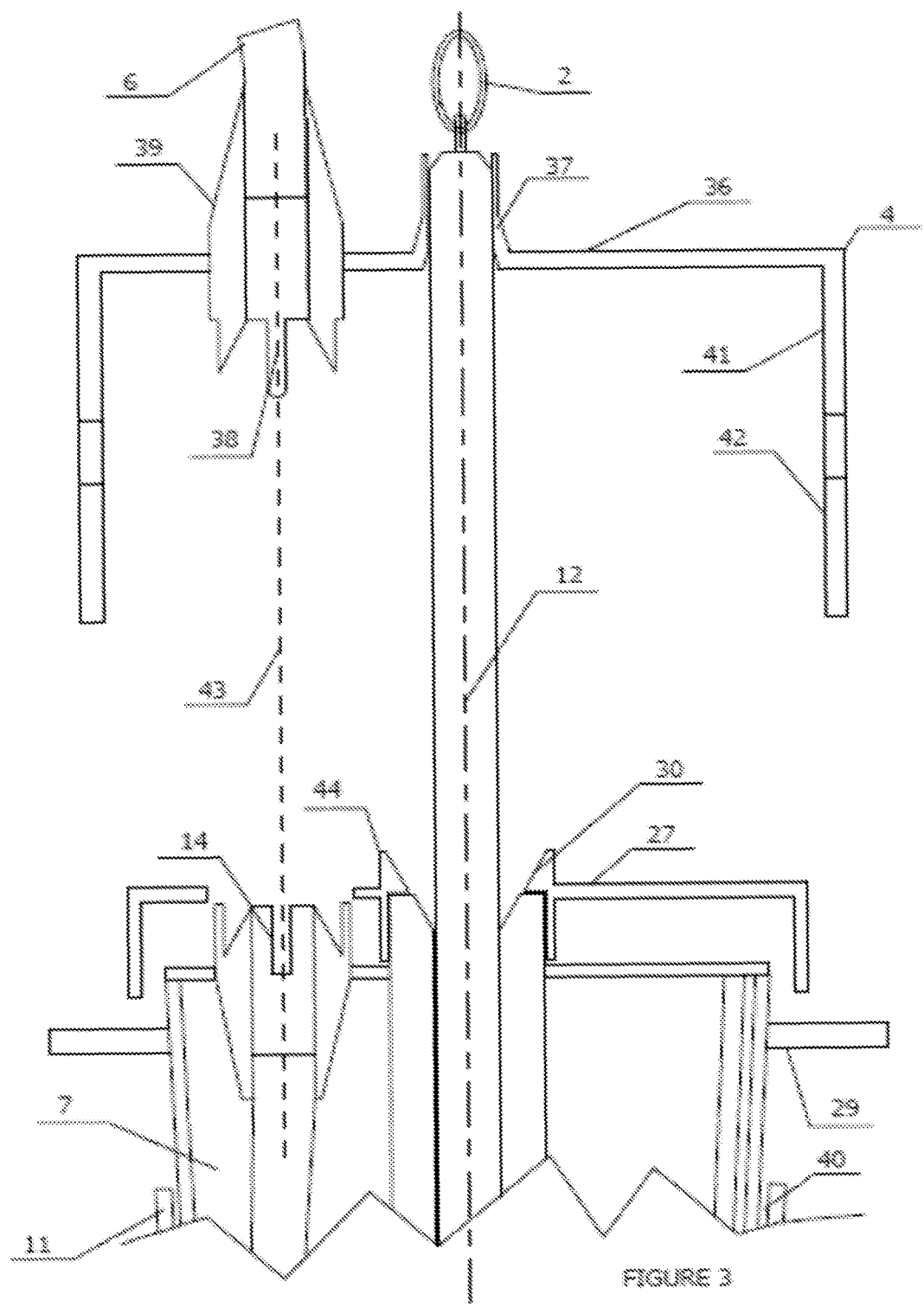
FIG. 3 shows a section view of the engagement of the shuttle rod in the outlet.

FIG. 3, still in section, shows the engagement of the shuttle rod (3) in the outlet. The outlet is made up mainly of:
- an endplate (36) pierced in its center by a hawse pipe (37), which presents small clearance relative to the shuttle rod (3) so as to bring the outlet (4) and the connector (7) into alignment on the same axis (12);
- three contacts (38) (which are shown herein by way of example as male contacts) surrounded by insulation (39) and connected to three cables (40) corresponding to the three phases used by way of example to exchange power between the ship and the quay; and
- at its periphery, a skirt (41) of substantially cylindrical shape having a diameter that is greater than the outside diameter of the lid (27), and provided with two funnel-shaped cutouts (42) for receiving the lugs (29) when the connector (7) is raised towards the outlet (4), which becomes engaged therein with progressively reducing clearance, such that each of the contacts (38) of the outlet is brought into alignment on a common axis (43) and likewise with small clearance with the corresponding contacts (14) of the connector (7).

Figure 4:
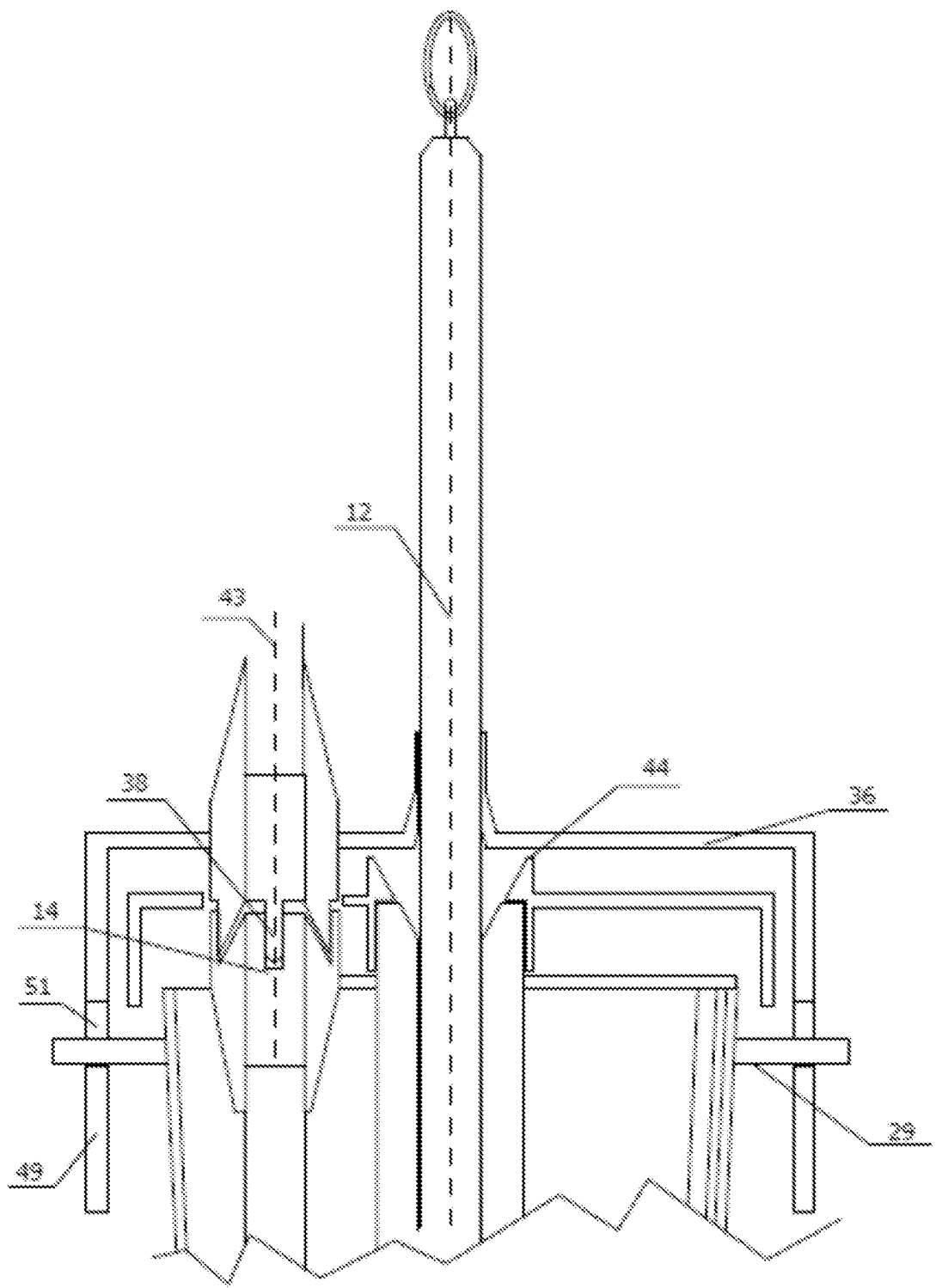
FIG. 4 shows an exchange of electricity in the outlet.

It can readily be understood that by means of this arrangement:
- when the shuttle rod raises the connector (7) and engages it initially with progressively reducing clearance in the hawse pipe (37) in the outlet (4), the connector becomes progressively aligned on the same axis (12) as the outlet;
- then when the lugs (29) meet the cutouts (42) in the skirt (41), the skirt is turned in such a manner that each of the pairs of contacts (38 and 14) is brought progressively into mutual alignment along the respective axes (43); and when the top portion of the lid (27) of the connector comes into abutment via the bearing surface (44) against the bottom face of the endplate (36) of the outlet, all three pairs of contacts are mutually engaged with small clearance, thereby enabling electricity to be exchanged, as shown in FIG. 4.

FIGS. 5a and 5b are plan views of the connector when the lid is respectively open or closed.

The lid is opened or closed merely by turning it about the axis (12) relative to the connector (7). In FIG. 5a, the openings (28) are in alignment with the contacts (14) and make connection possible. In FIG. 5b, the lid has been turned (by way of example through about 30° clockwise relative to the connector (7), e.g. using by means of a return spring, not shown for reasons of simplification). The openings (28) are then disengaged from the contacts (14) and the contacts are masked by the lid (27). The lid (27) is turned in this way relative to the connector by a pair of lugs (45) fastened to the periphery of the lid (27). These two lugs (45) correspond to two funnel-shaped openings (46) in the skirt (41) of the outlet (4). FIG. 6 is a developed half-view of the skirt (41) and for simplification purposes it includes only one of the two openings (42 and 46) together with an example of the respective paths (47 and 48) taken by the lugs (29 and 45) when the connector (7) is hoisted towards the outlet (4):

initially, neither the lugs (29) nor the lugs (45) are in contact with the skirt (41), and the lid (27) and the connector (7) are free to move in rotation, the lugs (29 and 45) then moving in parallel with one another, the lid (27) remaining closed, e.g. because of the above-mentioned return spring;

then at (49), the lug (29) meets the edge (50) of the opening (42), and sliding along this edge, progressively turns the connector about the axis (12) until it penetrates with small clearance in the vertical notch (51) thus guaranteeing that each pair of contacts (14 and 38) is in alignment along its respective axis (43); and the lug (45) remains free until reaching the point (52) where it meets the edge (53) of the opening (46), and by sliding along this edge forces the lid (27) to turn relative to the connector (7) so that when the lug (45) reaches the point (54), the connector is fully open, and thereafter holds it in this position by penetrating with small clearance into the vertical notch (55) thereby enabling the contacts (38) to pass into the openings (28) in the lid (27) and then engage in the contacts (14) of the connector (7), thus enabling electricity to be exchanged.

It can thus be observed that regardless of the initial angular position of the lug (29) in the angular zone (54), of amplitude that is typically of the order of about sixty degrees, the connector, on being raised towards the outlet (4), is progressively turned angularly with small clearance (typically a few degrees), thus enabling the various contacts to be brought into alignment, whereas the lug (45), on meeting the opening (46), serves to open the lid (27).

In order to ensure this angular pre-positioning of the connector in the zone (54), it is possible for example to use the stiffness of the sheet formed by the cables (9) to exert a return torque on the connector (7) about a mean angular position centered on the opening (42).

Figure 7:
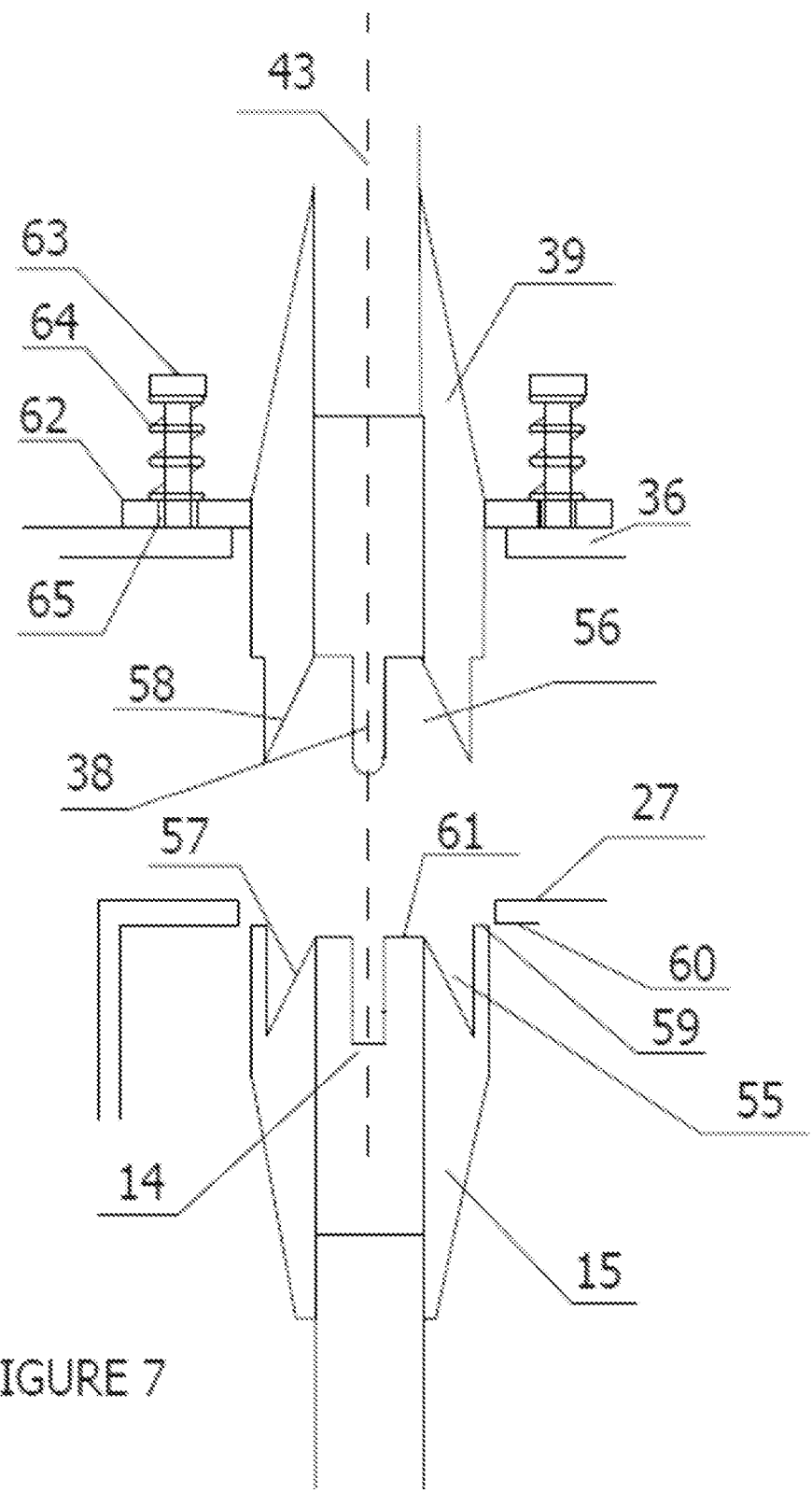
FIG. 7 shows a mount of the insulation of the contacts on respective floating flanges.

In order to ensure good quality for the connection between the three pairs of contacts (14 and 38), and as shown in FIG. 7, it should be observed that the insulation (15 and 39) is advantageously made of resilient materials such as rubber so as to avoid the potential appearance of static indeterminacy between the shuttle rod (3), the outlet (4), and the connector (7) when these elements are all mechanically engaged in one another. Furthermore, it should be observed that the shape of the insulation (15) of the contact (14) is characterized by the fact of having a substantially cylindrical shape with a substantially conical and concave shape (55), while the insulation (39) of the contact (38) presents a shape (56) that is identical but convex. It can thus be seen that when docking the connector (7) with the outlet (4), the faces (57 and 58) of the pieces of insulation become progressively engaged in one another, thereby contributing to the final and independent self-alignment of the three pairs of contacts (14 and 38).

In order to compensate for any possible misalignment between the three pairs of contacts, the shuttle rod, and the outlet, it is possible, optionally, and as shown in FIG. 7, to mount the insulation (39) of the contacts (38) on respective floating flanges (62) guided by a series of screws (63) with clearance (65), springs (64) pressing the flange against the endplate (36). It can thus be seen that each contact (38) can self-align with the contact (14) as a result of the clearance (65), and that the springs (64) will force them to engage in the contact (14). It can be understood that this may be applied alternatively to the insulation (15) of the contact (14) relative to the top endplate (13) of the connector (7).

Finally, it should be observed that the insulation (15) is characterized by the presence of a face (59) that is situated:

at a height that is perceptibly higher than the bottom face (60) of the lid (27); and perceptibly above the top face (61) of the contact (14).

By this means, when the lid (27) is closed, the face (59) of the insulation (15), as a result of its elasticity, rubs against the face (60) of the lid (27), thereby protecting the contact (14) from potential contamination such as moisture or dust.

FIG. 8 shows an implementation of the invention for powering a ship (66) when docked at a quay (67), characterized in that:

on the quay, the outlet (4) and the windlass (1) are suspended from a boom (68) that can move both horizontally along the axis Y perpendicular to the axis Z of the ship and vertically along a mast (69) that is fastened to the quay (67); and at the ship, the basket (11) receiving the connector (7) moves horizontally along the axis X.

By this arrangement, when the ship (66) is alongside the quay (67), it is possible to move the basket (11) and the boom (68), which can move respectively along the X axis and along the Y and Z axes in order to bring the outlet (4) and the windlass (1) into alignment above the basket (11) so as to make it possible, by lowering the chain (2), to engage the shuttle rod (3) in the connector (7), and then hoist it towards the outlet (4) until connection is established between the ship (66) and the quay (67), between the cables (9) and the connection box (70) on board the ship and the cables (6) and the connection box (71) on the quay.

It should be observed that the implementation of the invention shown in FIG. 8 is not limiting in any way and, by way of example, it is possible to consider using the invention to:

make connection with movable objects of types other than ships, e.g. road vehicles; and to connect a movable object with an installation that is fixed or else with another movable object.

Typically, and by way of example, for a three-phase electrical connection having a rating of about 500 amps (A), the three contacts (14) will have a diameter of about 15 millimeters (mm), the insulation (15) will have a diameter of about 100 mm and will be located at a distance of about 150 mm from the axis (12), and the contacts will be angularly distributed at about 60° relative to one another about this axis. The shuttle rod (3) will have a diameter of about 80 mm, whereas the inside diameter of the hawse pipe (37) and of the hub (17) will be about 81 mm, the clearances ( ) and ( ), whereas the clearance (65) between the flange (62) and the contacts (39) is about 2 mm.

The invention claimed is:

1. An assembly for making an electrical connection between a movable object and a fixed installation, or between two movable objects, the assembly comprising the following elements of substantially cylindrical shape, going downwards and centered around a vertical axis:
   a windlass using a chain or a cable to move a shuttle rod along this main vertical axis;
   an outlet receiving a plurality of electrical contacts and provided in its bottom portion with a peripheral skirt having funnel-shaped openings, larger openings facing downwards, and a hawse pipe in which the shuttle rod can engage with small clearance; and
   a connector provided with:
      a top endplate receiving, facing the contacts of the outlet, complementary contacts;
      one or more lugs controlling progressive turning of the connector relative to the outlet and about the main vertical axis while they are being progressively engaged in the opening(s) of shapes that are defined so that when the top of the connector engages in the outlet, the contacts are brought progressively into mutual alignment so as to make it possible for them to engage in one another when the connector comes into abutment against the outlet;
      a lid:
         of a diameter perceptibly smaller than the diameter of the skirt;
         placed above the top endplate;
         turnable about the main vertical axis and protecting the contacts;
         provided with a plurality of openings that, when in alignment with the contacts, enable the contacts to be engaged with the contacts;
         one or more lugs controlling progressive turning of the lid about the main vertical axis when they are engaged in the opening(s) of shape that is defined so that when the contacts are in alignment as a result of the connector turning under the control of the lugs engaging in the openings, the lid turns progressively so as to bring the openings to face the contacts and enable them to engage the contacts; and
         provided with an opening centered on the main vertical axis, of funnel-shape and facilitating insertion of the shuttle rod with progressively reducing clearance on being lowered towards the connector into a central cavity of a hub that is secured to the top endplate, until, at the end of its stroke, the rod encounters a locking system secured to said hub:
      a hub
         transferring forces from the shuttle rod against the locking system to the top endplate and the connector assembly; and
         acting as a rotary bearing about the main vertical axis for the lid;
      a cover of conical shape, and together with the lid surrounding the entire connector;
      a shuttle rod passing downwards with small clearance successively through the hawse pipe of the outlet, then the lid, and once more with small clearance through the hub of the connector, characterized by the presence at its bottom end of a substantially conical shape and of a recess presenting a bearing face for the locking system for locking with the connector; and
      a basket of funnel-shape with its large opening towards the top, complementary to the shape of the cover of the connector, and centering it along the main vertical axis.

2. The electrical connection assembly according to claim 1, wherein one or more jaws each turning about a horizontal axis has a shape that is substantially trapezoidal, characterized by the facts that:
   their bottom faces bearing both against a face of a recess in the shuttle rod and against a face of a cavity in the hub enable the rod to apply traction to the connection assembly towards the outlet;
   in the sloping position, the shape of the trapezoid causes the jaws to release the shuttle rod from the connector and enable it to be hoisted freely towards the outlet; and
   the shape of the trapezoid is such that under the effect of gravity, the jaws turn about their pins and drop under their own weight against the bearing faces of the hub.

3. The electrical connection assembly according to claim 1, wherein the contacts are surrounded by insulation made of a substantially resilient material and providing a top lip that:
   is perceptibly above the top ends of the contacts; and
   by rubbing against the bottom face of the lid protects the contacts from external pollution.

4. An The electrical connection assembly according to claim 1, wherein the contacts of the outlet are surrounded by insulation mounted on respective floating flanges:
   guided with a certain amount of clearance by a series of screws fastened in the outlet; and
   urged by springs against the outlet.

5. The electrical connection assembly according to claim 1, wherein the contacts of the connector are surrounded by insulation mounted on respective floating flanges:
   guided, with a certain amount of clearance, by a series of screws fastened in the top endplate of the connector; and
   urged by springs against the endplate.

6. The electrical connection assembly according to claim 1, wherein the insulation of the contact(s) of the connector and of the contact(s) of the outlet presents a shape that is cylindrical and that the insulation of the contacts of the connector presents a shape that is substantially conical and concave, while the insulation of the contacts of the outlet presents, with small clearance, a convex shape that is complementary.

7. The electrical connection assembly according to claim 1, wherein the vertical alignment on a common vertical axis Z in an orthogonal Y, Y, Z reference frame of these various components is obtained:
   by the fact that the basket receiving the connector can move along the X axis; and
   by the fact that the windlass and the outlet are attached to a movable boom that can move along the Y axis.

8. The electrical connection assembly according to claim 7, wherein the movable boom to which the windlass and the outlet are attached can move vertically along a mast.

\* \* \* \* \*